(12) United States Patent
Goodes

(10) Patent No.: US 10,705,898 B2
(45) Date of Patent: Jul. 7, 2020

(54) TRANSMITTING SURREPTITIOUS DATA ON AN EXISTING COMMUNICATION CHANNEL

(71) Applicant: ARXAN TECHNOLOGIES, INC., San Francisco, CA (US)

(72) Inventor: Grant Stewart Goodes, Manotick (CA)

(73) Assignee: ARXAN TECHNOLOGIES, INC., San Francisco, CA (US)

(*) Notice: Subject to any disclaimer, the term of this patent is extended or adjusted under 35 U.S.C. 154(b) by 73 days.

(21) Appl. No.: 15/962,830

(22) Filed: Apr. 25, 2018

(65) Prior Publication Data
US 2020/0028833 A1    Jan. 23, 2020

Related U.S. Application Data

(60) Provisional application No. 62/491,177, filed on Apr. 27, 2017.

(51) Int. Cl.
| | | |
|---|---|---|
| *G06F 11/07* | (2006.01) | |
| *H03M 13/09* | (2006.01) | |
| *G06F 11/00* | (2006.01) | |
| *H04L 29/06* | (2006.01) | |

(52) U.S. Cl.
CPC ............ *G06F 11/07* (2013.01); *G06F 11/004* (2013.01); *H03M 13/09* (2013.01); *H04L 63/1466* (2013.01)

(58) Field of Classification Search
CPC .... G06F 11/07; G06F 11/004; H04L 63/1466; H03M 13/09

USPC ................................. 714/703, 712, 799, 821
See application file for complete search history.

(56) References Cited

U.S. PATENT DOCUMENTS

| | | | | |
|---|---|---|---|---|
| 3,893,072 | A * | 7/1975 | D'Antonio | ..................... 714/751 |
| 4,736,376 | A * | 4/1988 | Stiffler | .................. H03M 13/19 |
| | | | | 714/703 |
| 6,044,483 | A * | 3/2000 | Chen | ..................... G06F 11/1044 |
| | | | | 714/48 |
| 6,539,503 | B1 * | 3/2003 | Walker | ................ G01R 31/3183 |
| | | | | 714/32 |
| 6,590,929 | B1 * | 7/2003 | Williams | ......... G01R 31/31813 |
| | | | | 375/224 |
| 7,278,084 | B2 * | 10/2007 | Palin | ..................... H04B 1/7183 |
| | | | | 714/758 |
| 7,321,996 | B1 * | 1/2008 | Draper | ................. G06F 11/2215 |
| | | | | 714/703 |
| 8,351,605 | B2 * | 1/2013 | Bandholz | .............. H04L 1/1829 |
| | | | | 380/255 |
| 9,391,638 | B1 * | 7/2016 | Metuki | .................. H03M 13/09 |
| 9,886,597 | B2 * | 2/2018 | Bringer | ............ G06K 19/07309 |
| 10,015,028 | B2 * | 7/2018 | Jorgensen | .............. H03F 1/3241 |
| 2008/0002854 | A1 * | 1/2008 | Tehranchi | ................ G06F 21/10 |
| | | | | 382/100 |

(Continued)

*Primary Examiner* — John J Tabone, Jr.
(74) *Attorney, Agent, or Firm* — Mannava & Kang, P.C.

(57) ABSTRACT

A method and system to surreptitiously inject data into a data stream over a communication channel including an error correction encoder circuit to apply an error correction scheme to a data stream to create an unfaulted data, a binary to bit value positioner that converts bits in confidential data to corresponding position value of bits in a packet, and a data stream encoder that flips a bit in the unfaulted data based on the binary to bit value positioner to create a bit-faulted data.

20 Claims, 9 Drawing Sheets

(56) References Cited

U.S. PATENT DOCUMENTS

| | | | | |
|---|---|---|---|---|
| 2008/0126766 A1* | 5/2008 | Chheda | ............... | G06F 9/30003 |
| | | | | 712/226 |
| 2011/0179320 A1* | 7/2011 | Quere | ................ | H04N 21/2383 |
| | | | | 714/712 |
| 2012/0266033 A1* | 10/2012 | Gold | ................... | G06F 11/1052 |
| | | | | 714/718 |
| 2013/0346798 A1* | 12/2013 | Moyer | ................ | G06F 11/1008 |
| | | | | 714/27 |
| 2014/0006904 A1* | 1/2014 | Gendler | ............. | G06F 11/1012 |
| | | | | 714/773 |
| 2014/0254929 A1* | 9/2014 | Wu | ...................... | H04N 19/129 |
| | | | | 382/166 |
| 2014/0281762 A1* | 9/2014 | Norrie | ................ | G06F 11/2215 |
| | | | | 714/703 |
| 2015/0085748 A1* | 3/2015 | Jorgensen | ............. | H03F 1/3241 |
| | | | | 370/328 |
| 2018/0175889 A1* | 6/2018 | Bazarsky | .......... | H03M 13/3723 |

* cited by examiner

TRANSMITTING SURREPTITIOUS DATA ON AN EXISTING COMMUNICATION CHANNEL

CROSS-REFERENCE TO RELATED APPLICATION

This application claims the benefit of U.S. Provisional Application No. 62/491,177, filed on Apr. 27, 2017, the content of which is expressly incorporated herein by reference thereto.

FIELD OF THE INVENTION

The present disclosure generally relates to one or more examples of a system, a method, and non-transitory computer readable storage medium, including machine readable instructions executable on a processor to transmit data on a communication channel. More specifically, the present disclosure relates to one or more examples of a system and method to surreptitiously inject data into a message, original data, or traffic over a communication channel by applying error detection and correction scheme and intentionally introducing at least one bit-fault.

BACKGROUND INFORMATION

Secure communications over a public channel between two parties is often achieved by the use of some form of encryption. The original data and a confidential data can be encrypted by the sender and decrypted by the recipient. The original data is sent separately, followed by the confidential data. Any attacker able to intercept the transmission on the communications channel, but lacking the decryption key may be unable to determine the content of the original data unless they break the encryption cipher. Alternatively, both the original data and the confidential data can be encrypted and sent together.

A disadvantage of transmitting the confidential data as a second stream of stand-alone data is that, although an attacker may need to break the encryption cipher to access the content of the data, it is relatively easy for an attacker to distinguish the primary data from the confidential data streams by observing the traffic on the communication channel, and thus, intercepting the confidential data. This may lead to more targeted attacks to identify or decipher the confidential data.

A disadvantage of transmitting confidential message and a primary message that are encrypted together and sent out together is that, the attacker can determine the difference in packet sizes of the messages being transmitted. This can lead the attacker to conclude that some messages contain confidential messages. This may lead to more targeted attacks to identify or decipher the confidential messages. In addition, a message with and without additional payload may provide an attack vector to the cipher key.

SUMMARY OF THE INVENTION

In an aspect, having the confidential data piggy-back on the primary data traffic, in an approach, which can be called side-channel communication, can prevent an attacker's ability to distinguish the primary data from the confidential data.

In an aspect, a non-transitory computer readable storage medium, including machine readable instructions executable on a processor to apply error correction scheme to a data stream to generate an unfaulted data, introduce at least one bit-fault to the unfaulted data based on confidential data on a side channel to generate a bit-faulted data, and transmit the bit-faulted data.

In an aspect, to introduce the at least one bit-fault, bits in the confidential data are converted to a corresponding position value of bits in a packet, wherein at least one bit is high; and the unfaulted data and the corresponding position value of bits in the packet are introduced to an encoder.

In another aspect, the confidential data having a set of bits are converted to a number of bits in the unfaulted data by a bit value positioner.

In a further aspect, the confidential data corresponds to binary numbers associated with position of at least one flipped bit in the bit-faulted data.

In a further aspect, wherein the bit-faulted data comprises at least one bit that is flipped in the unfaulted data.

In yet another aspect, the at least one bit that is flipped corresponds to a binary number associated with the confidential data.

In an aspect, the machine readable instructions executable on a processor encrypts at least one of data stream; the unfaulted data; and the bit-faulted data.

In a further aspect, the machine readable instructions executable on a processor to permutate the bit-faulted data.

In an aspect, a non-transitory computer readable storage medium, including machine readable instructions executable on a processor to receive a data stream, detect if the received data stream includes at least one bit-fault, wherein if the received data stream includes at least one bit-fault, then the received data stream comprises an error correction scheme that detects the at least one bit-fault, and recover confidential data based on the at least one bit-fault.

In another aspect, non-transitory computer readable storage medium comprises a comparator that compares an original data to the received data stream to discover the at least one bit-fault.

In a further aspect, the detected at least one bit-fault corresponds to a binary number associated with the confidential data on a side-channel.

In yet another aspect, the machine readable instructions executable on a processor reverses a permutation of the received data stream.

In an aspect, the machine readable instructions executable on a processor recovers confidential data based on the at least one bit-fault comprising bits to bits decoder.

In another aspect, the bits to bits decoder converts position value of bits in a packet to a corresponding bits in the confidential data.

In a further aspect, a system to surreptitiously inject confidential data into original data over a communication channel including an error correction encoder circuit to apply an error correction scheme to a data stream to create an unfaulted data, a binary to bit value positioner that converts bits in confidential data to corresponding position value of bits in a packet, and a data stream encoder that flips a bit in the unfaulted data based on the binary to bit value positioner to create a bit-faulted data.

In yet another aspect, the flipped bit comprises a binary number associated with the confidential data.

In an aspect, the system further includes an encrypter that applies an encryption code at least one of (i) prior to the error correction encoder circuit, (ii) prior to the data stream encoder, (iii) and after the data stream encoder.

In another aspect, the system further includes a permutation applicator to permutate the bit-faulted data.

In an aspect, a system to recover confidential data that is surreptitiously injected into original data over a communication channel including an input interface to receive a data stream, an error correction decoder circuit to at least one of recover original data from the data stream and detect at least one bit-fault, and a bit to bit decoder that converts a position value of bits in a packet to a corresponding bits in the confidential data.

In another aspect, the system further including a comparator that compares the recovered original data to the data stream and detects if the received data stream includes at least one bit-fault.

In a further aspect, the comparator determines the position value of bits in a packet that correspond to the confidential data.

In yet another aspect, the system further including a permutation applicator to reverse a permutation of the received data stream.

Additional features and advantages of various embodiments will be set forth, in part, in the description that follows, and will, in part, be apparent from the description, or may be learned by the practice of various embodiments. The objectives and other advantages of various embodiments will be realized and attained by means of the elements and combinations particularly pointed out in the description herein.

BRIEF DESCRIPTION OF THE DRAWINGS

The present disclosure in its several aspects and embodiments can be more fully understood from the detailed description and the accompanying drawings, wherein.

Throughout this specification and figures like reference numbers identify like elements.

DETAILED DESCRIPTION OF EMBODIMENT

Figure 1:
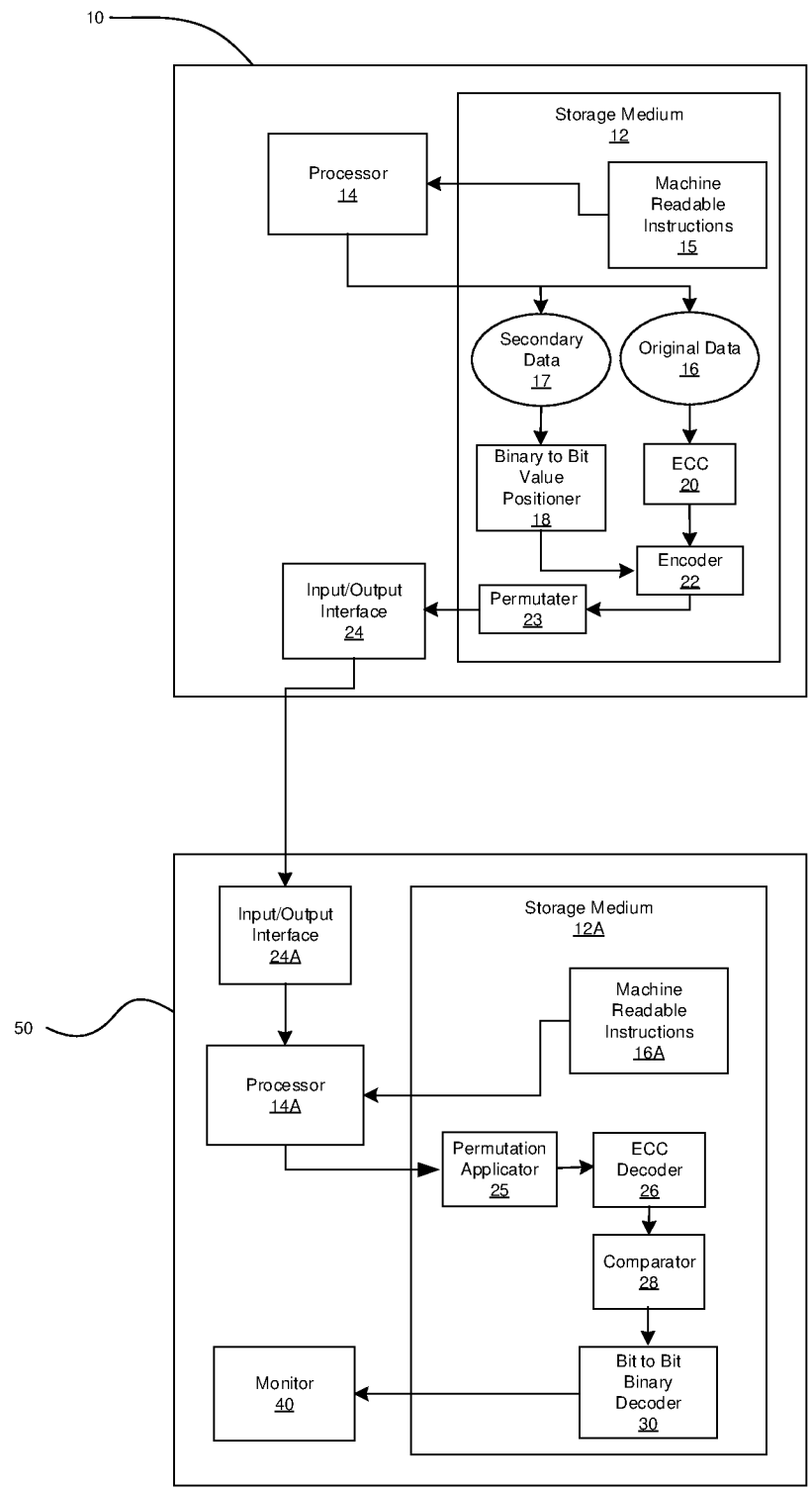
FIG. 1 is an overall block diagram of a surreptitious message sending device and a message receiving device, according to an example of the present disclosure.

It is to be understood that both the foregoing general description and the following detailed description are exemplary and explanatory only, and are intended to provide an explanation of various embodiments of the present teachings.

Definitions

The phrase "unfaulted data," as used herein, refers to data or a message, generally in a form of binary numbers, that includes an error detection and correction scheme so that any errors introduced during the transmission of the data can be detected and potentially corrected at a receiver's end, thus the received data would be fault free or unfaulted.

The phrase "bit-faulted data," as used herein, refers to data that includes at least one of bit-fault that is purposely added into the unfaulted data.

The phrase "bit-fault," as used herein, refers to at least one bit that has been flipped.

The phrase "packets," as used herein, refers to the data that have been divided into pre-determined fixed or variable size packets.

The phrase "side channel," as used herein, refers to a channel in which a secondary data stream, which can include confidential data, piggy-backs on the primary data (i.e., original data or message) traffic.

Overview

In its broad and varied embodiments, disclosed herein a method, system, and a non-transitory computer readable storage medium, including machine readable instructions executable on a processor to allow surreptitious introduction or injection of confidential data into original data stream or traffic over a communication channel. Original data stream can be a data that is originated by the user or user's computer, a data that is being passed along from another source, or a data that has been intercepted. This can be accomplished by applying an error detection and correction scheme into the original data stream to generate an unfaulted data and intentionally introducing at least one bit-fault into the unfaulted data. The introduced bit-fault can be based on confidential data on a side channel to generate a bit-faulted data. Upon reception of the bit-faulted data, error detection and correction can be performed to determine the flipped bit and/or recover the original data contents. The presence and position of the at least one bit-fault can be used to decode the content of confidential data. This approach has several desirable properties, including low overhead (i.e., the final data-size can be only slightly larger than the original data-size plus the size of the confidential data), low observability of the presence of confidential data (i.e., the data or messages with- and without confidential data can appear very similar, including having identical sizes), security of the confidential data (i.e., the encoding of the confidential data can be non-obvious), and independence from the format or encoding of the original data content.

Overall System

Transmitting data surreptitiously can be very useful. An example of where transmitting data surreptitiously can be useful is in attack response telemetry. For example, a system having a protected application with surreptitiously injected confidential data can enable the system to detect various forms of hacking/attacking, and provide details (telemetry) of those attacks on the server. The server may, in turn, send back a "response action," telling the application what to do in response to the attacks (e.g. shut-down, crash, hang, minimize, etc.). Another example where transmitting data surreptitiously can be useful is in usage telemetry. For example, simple usage information about how a customer is utilizing an application can be surreptitiously transmitted.

The data would ideally be anonymized (stripping all customer-identifying information out), and can be used to adjust payment models, intelligent help-system, feature development, targeted advertising, etc. Other examples can include in-game advertising feeds, hyper-secure side channel, and keep alive, heart-beat information. Some examples of such uses include, but are not limited to, sending a cryptographic key down to a device by surreptitiously injecting confidential data on top of normal traffic to make it very difficult for a hacker to detect that a cryptographic key is being sent. Furthermore, an application that should only run when connected to a legitimate server can expect packets on the side channel to arrive at regular intervals. Failure to receive the packets on the side channel at regular intervals can be considered an attack and can result in shutting down the application to prevent loss or hacking of the application.

An exemplary overall schematic for sending and receiving surreptitiously injected confidential data is shown in FIG. 1, as sending device 10 and a data receiving device 50. The sending device 10 can include a processor 14 to execute commands, and a storage medium 12. The sending device 10 or the storage medium 12 of the sending device 10 can include one or more sets of instructions 15, an original data 16 to be sent out, confidential data 17, which can be in a secondary data stream, a binary to bit value positioner 18, an error correction scheme 20, an encoder 22, an optional encryption scheme, and an optional permutater 23. The results of the encoder 22 or the optional permutater 23 or the optional encryption scheme, not shown in the Figs., can then be sent out by an output interface 24.

Figure 2:
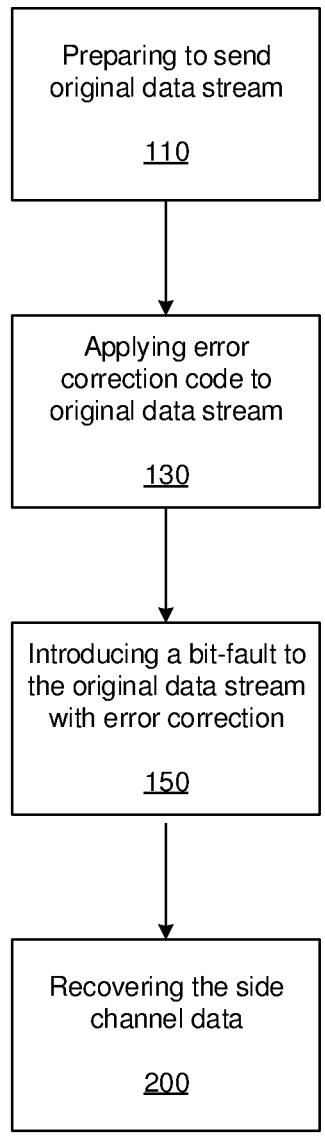
FIG. 2 is a flowchart of the overall system, according to an example of the present disclosure.

In practice, the instructions 15 can command the processor 14 to send out a set of original data 16 (see also FIG. 2, step 110) to a data receiving device 50 and to surreptitiously inject confidential data 17 into the original data 16. In response, the processor 14 can request the confidential data 17 to be sent to the binary to bit value positioner 18. The binary to bit value positioner 18 can convert or determine the binary number associated with the confidential data 17 into a decimal position value. The processor 14 can also request that an error correction scheme 20 be applied to or be added to the original data 16 to generate an unfaulted data (see also FIG. 2, step 130). This unfaulted data and the position value derived from the binary to bit value positioner 18 can then be forwarded to the encoder 22. The encoder 22 can flip at least one bit associated with the derived position value to create a bit-faulted data (see also FIG. 2, step 150). This bit-faulted data can then be sent to the output interface 24 to be sent out to the data receiving device 50, which can recover the confidential data 17 (see also FIG. 2, step 200).

The data receiving device 50 can use the bit that is flipped to decode the binary number corresponding to the confidential data transmitted as a side channel. In an example, the sending device 10 and data receiving device 50 can agree on a scheme to map each specific pattern of bit-flips to a unique confidential data value. In the case of a single bit-flip scheme, the easiest mapping can be simply to say that the numerical position of the flipped-bit (using a 0-based numbering scheme, such that one bit is numbered "0", and the next "1", up to N−1 for the final bit of an N-bit message) is directly the transmitted confidential data value. Thus, if bit 0 is flipped, the side-channel message value is 0, etc.

To determine the position and, as a result the confidential data on the side channel, of the flipped bit, the data receiving device 50 can include a monitor 40 to potentially display the confidential data, an input interface 24A, a processor 14A, and a storage medium 12A. The data receiving device 50 or the storage medium 12A of the data receiving device 50 can include a set of instructions 16A, an optional decryption device/scheme, an optional permutation applicator 25, an error correction scheme decoder 26, an optional comparator 28, and a bit to bit binary decoder 30. The input interface 24A can receive the bit-faulted data from the output interface 24. As a result, instruction 16A in the storage medium 12A can command the processor to arrive at the confidential data. As a result, if the bit-faulted data is encrypted and/or includes a permutation, then the processor 14A can forward the bit-faulted message to the decryption device/scheme and/or the permutation applicator 25, respectively, prior to sending the data to an error correction decoder 26. The permutation applicator 25 can apply a previously received or known permutation so that the permutated bits are placed in the correct position prior to sending the bit-faulted message to the error correction decoder 26. In an example, the error correction decoder 26 can determine which bit in the bit-faulted data was flipped, which can be used to decode the binary number corresponding to the transmitted confidential data on the side-channel. Alternatively, if the error correction decoder 26 corrected any errors so that the output is the original message, to determine which bit in the bit-faulted data was flipped, the outputted original data from the error correction decoder 26 can be sent to a comparator 28 where the original data from the error correction decoder 26 can be compared to the bit-faulted data. This comparison can result in determining the position or location of the flipped bit, which can be used to decode the binary number corresponding to the confidential data in the side-channel. To decode the position or location of the flipped bit to its corresponding binary number, a bit to bit binary decoder 30 can be utilized.

Original Data

Figure 3:
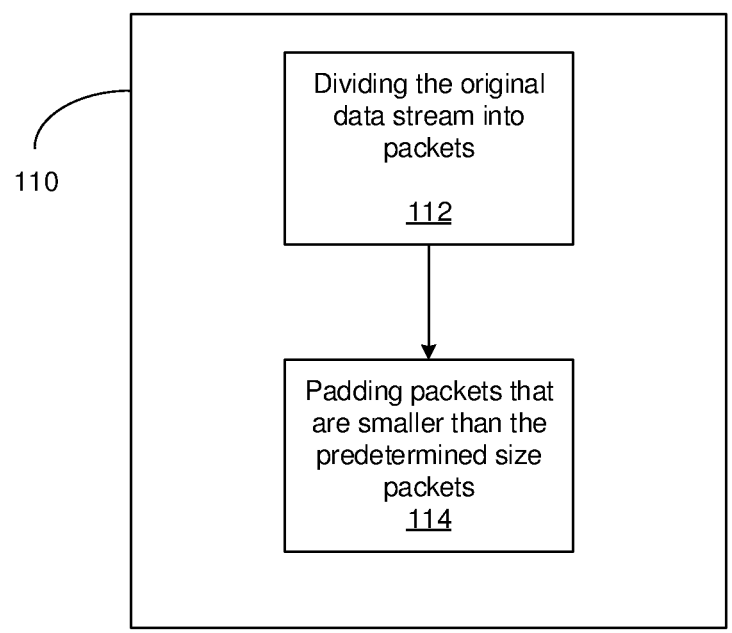
FIG. 3 is a flowchart detailing the steps involved in preparing to send an original data stream, according to an example of the present disclosure.

Referring to FIG. 3, in an example, the original data stream can be a user generated data stream, a computer generated data stream, a communication data stream from one communication device to itself or to another device, a pass-through data stream, and/or an intercepted data stream. Prior to applying the error correction scheme of step 130 to the original data stream, at step 112 of FIG. 3, the original data stream can be divided into a sequence of predetermined-size (F) packets or arbitrary-sized packets. A predetermined-size (F) packet can provide a superior security feature; however, it is not intrinsic or required to use predetermined-size (F) packets. In fact, a set of completely arbitrary-sized packets can also be used. However, using arbitrary-sized packets can result in a less secure and/or less surreptitious data transfer. The result of dividing the original data stream into a stream of packets can be a data stream that can include a "start" packet, which can contain information, such as the type of data involved, the number of expected packets in the stream, and a total-length of the packet data. The start packet can be followed by a plurality of data-packets, and possibly an "end" packet. The presence or absence of padding (discussed below) can be determined by data in the "start" or the "end" packet (such as the total-length field), and can be detected appropriately by the data receiving device 50.

In an example, a predetermined-size packet (F) can include a value of power of 2. In one example, the original data stream can be divided to a sequence of 256-bit (32-byte) packets. The predetermined-size packets can be created by a software program, by a hardware, or by a combination of both. If any of the data or fractions of the data are smaller than the predetermined-size packets (e.g., smaller than 256-bits), then, at step 114, those packets can be padded using some scheme that would allow removal of the padding upon receipt. As stated above, an exemplary padding scheme can include a scheme where the first byte of the packet can include a "padding-indicator", followed by the data of the packet, and then followed by padding (if present). Alternatively, the padding-indicator can be followed by the padding (if present), and then followed by the data of the packet. If the padding-indicator is zero, then the rest of the packet is pure-data, with no padding. If it is non-zero, then the value indicates the number of bytes of padding that has been added. Up to 255-bytes of padding can be added, especially if the "padding-indicator" is a byte (8-bits). This can be extended by a special padding-length of 255 (0xFF), which indicates that the next 32-bit field is the "long padding-length." This scheme can allow up to 32,768-bytes of padding. Similarly, this "long padding-length" schemed can be extended to allow for 64-bit lengths. In an example, if the first byte is 0xFF and the next 4-bytes are 0xFFFFFFFF, then the next 64-bit (8-byte) field can be the "long-long padding-length." This scheme can continue until desired bits and padding lengths have been reached.

Padding of packets that are smaller than the predetermined-size packets are especially useful. Data-size can often be used by attackers to reverse-engineer the purpose of individual data or messages. Thus, introducing a protocol that packetizes the original data into sequences of fixed-size transmission packets (including a padding scheme to increase the size of any data that are shorter than the desired fixed-size) can prevent or reduce the likelihood of the attackers to deduce the purpose of individual data. Accordingly, data on the communications channel can include the same size, and together with encryption of the packet contents, makes reversing the semantics of the data stream very difficult.

In an alternative example where an arbitrary error correction schemes may be used, bit flips can be added to the "raw" data without padding, using whatever bits are available. In this alternative embodiment, the confidential data would have to be taken off in variable size chunks, and re-assembled on the receiving end in a similar manner.

In another example, padding can be used to artificially enlarge the size of packets that do not include a flipped bit that can be used to decode the binary number corresponding to the transmitted confidential data on the side-channel. This exemplary embodiment can result in the attackers attempting to breach a data that does not include any confidential data and ignoring the confidential data that can be in the secondary data stream.

In another example, the data can be intentionally chopped into variable sized packets that do not correspond to the size of the original inputted data. This intentional transmittal of a long-packet when a short packet is required, or many short packets when a long packet is needed can confuse a potential attacker. In this example, the number of ECC-bits in each packet can be different and, thus, the amount of confidential data transmitted in each packet can vary. Accordingly, a receiver of the data may need to determine the configuration of the variable sized packets to retrieve any confidential data injected into the original data stream.

Generating an Unfaulted Data

Figure 4:
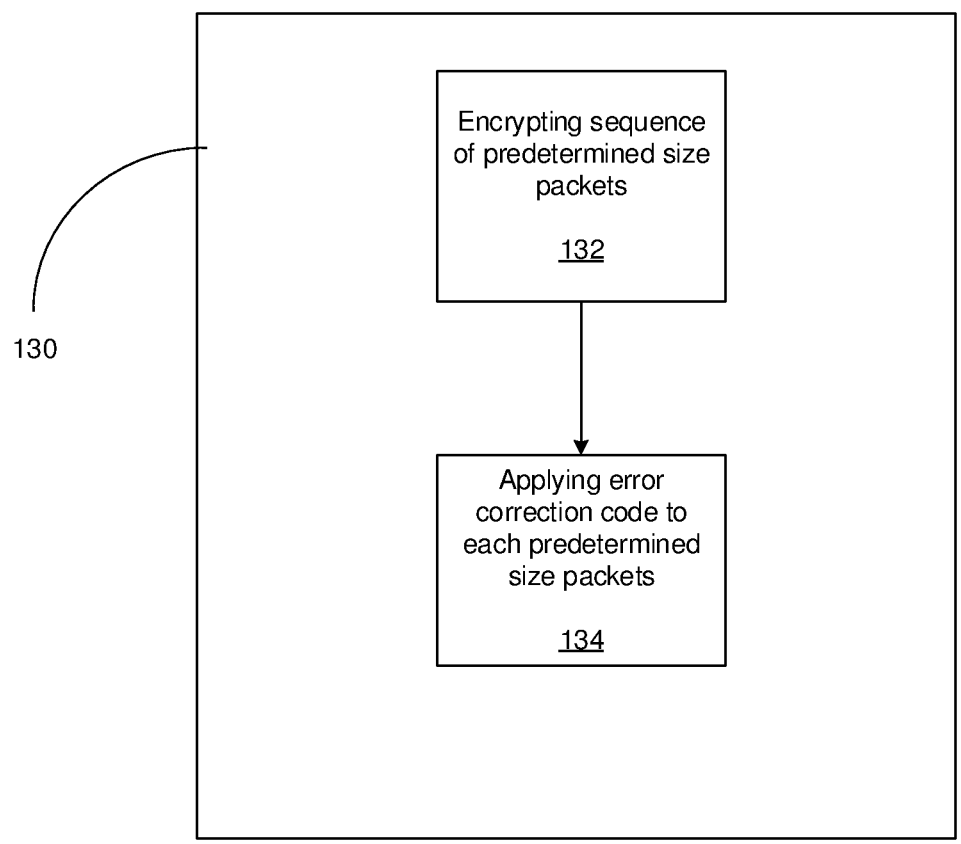
FIG. 4 is a flowchart detailing the steps involved in applying error correction to the intercepted data stream to generate an unfaulted message, according to an example of the present disclosure.

As an option, the original data stream can be encrypted, especially if the raw data had not already been encrypted. Moreover, encrypting the data can be performed prior to padding the packets in step 114 or, as shown in FIG. 4, after padding the packets. In an example, as shown in FIG. 4, at step 132, each sequence of predetermined-size packets can be encrypted. Encrypting the original data stream (both payload and any metadata) using a modern cryptographic cipher can be useful, as the resulting ciphertext can resemble a random stream of bits. Encrypting the original data stream can make it much more difficult for an attacker to detect patterns in the content of the data, which might reveal both details of the underlying communications protocol and the scheme being used to encode the secondary data stream. Encryption can also take place either before adding the error correction scheme (and subsequent bit-flips) is applied, or after adding the error correction scheme (post-encryption). In an alternative example, the encryption may be added after introducing the at least one bit-fault. In some cases, post-encryption may be preferred (e.g., when the encryption scheme used can change the size of the data).

As stated above, to generate the unfaulted data, at step 134, an error correction scheme can be added to the original data stream or the original data stream that has been divided to a sequence of predetermined-size packets. The error correction scheme can provide reliable transport of digital data over potentially unreliable communication channels. Encoding data in a particular form can permit the recovery of the original data stream contents even in the presence of a number of errors introduced during transmission from a source to a receiver.

Any error correction scheme can be used including ones without having error-correction bits. Such an error correction could include transmission of the data more than once, with faults being detected by comparing the re-transmitted data. Other exemplary error correction schemes that can be used include convolutional codes or block codes. Some examples of block codes include, but are not limited to, Repetition codes, Hamming codes, Multidimensional Parity-Check codes, Reed-Solomon codes, Turbo codes, and Low-Density Parity-Check codes.

In an example, the selected error correcting scheme may exhibit certain known properties in the format of the resulting unfaulted data, such as known constant metadata, or the presence of parity bits in fixed bit-positions, etc. Accordingly, it can be advantageous to perform one of a number of encoding operations on the bit-faulted data (discussed below), such as permuting (scrambling) the bits, or encrypting the frame, etc. Whatever encoding scheme is used, it must be in agreement on the sender's and receiver's side so that the unencoded data may be recovered.

Figure 5A:
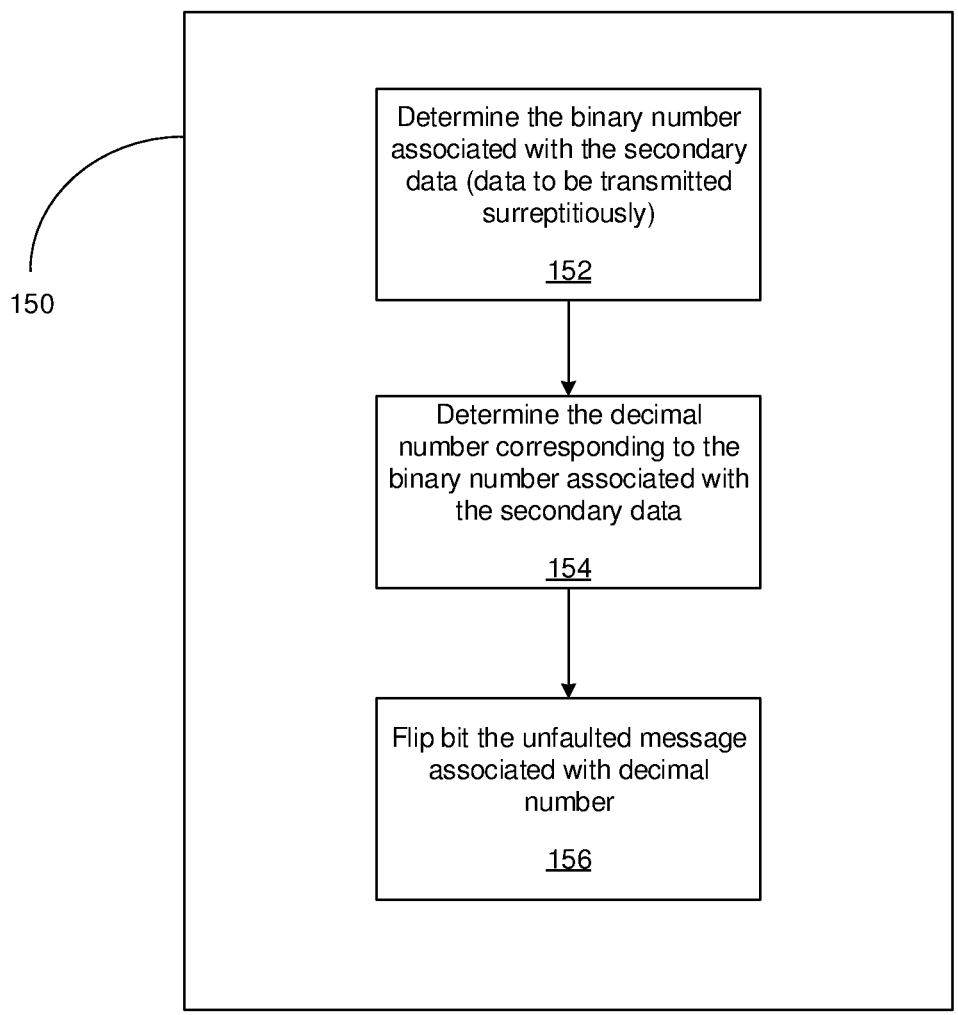
FIG. 5A is a flowchart detailing the steps involved in introducing at least one bit-fault to the unfaulted data to generate a bit-faulted data, according to an example of the present disclosure.
Figure 5B:
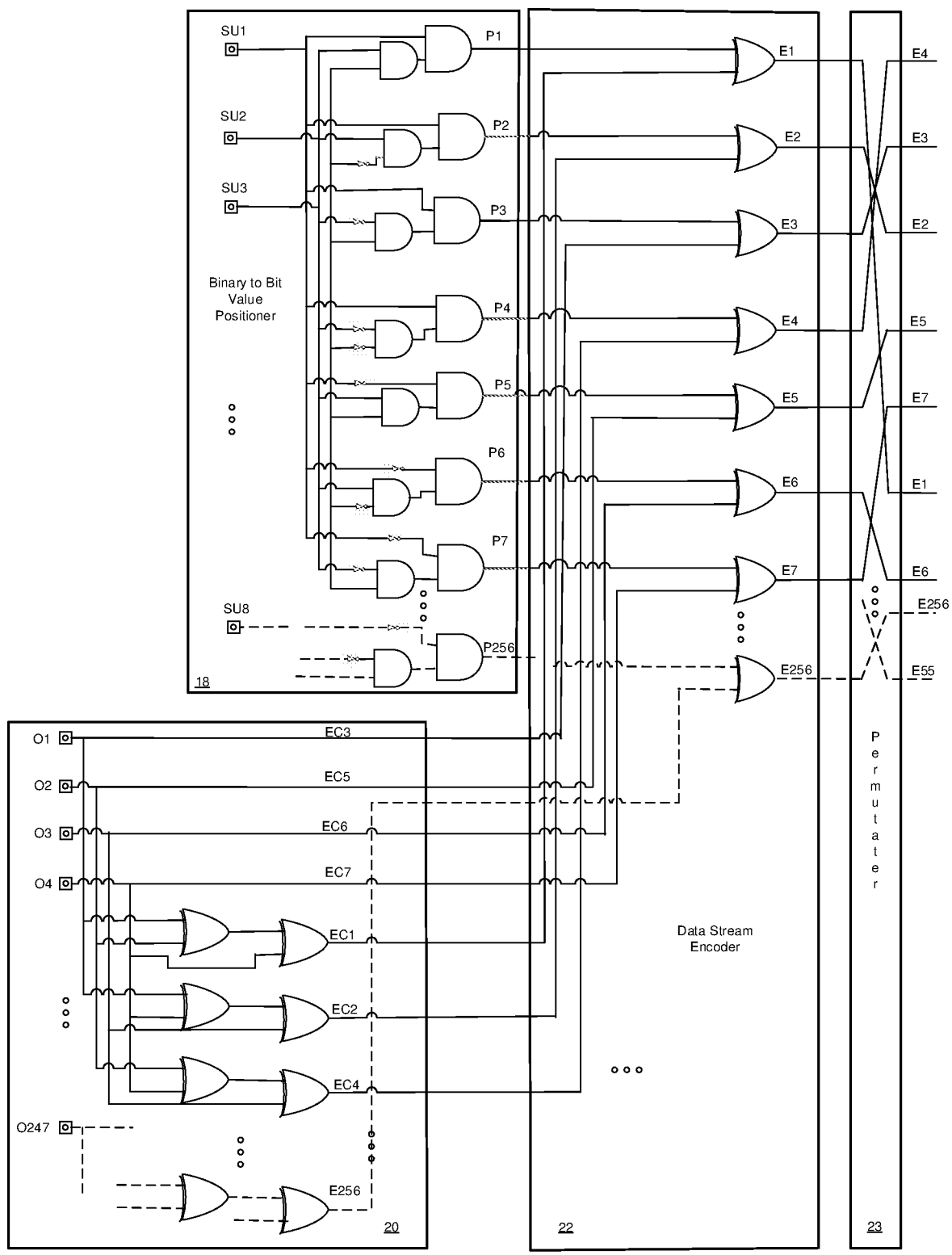
FIG. 5B is an exemplary circuit that can introduce at least one bit-fault to the unfaulted data to generate a bit-faulted data, according to an example of the present disclosure.

An exemplary error correction scheme is shown at 20 of FIG. 5B. In this example, the original data can include up to 247 bits (O1-O247) of data, which can result in an output of 256 bits (EC1-EC256). From the 256 bits, 247 bits can be data and 9 can be parity bits. In an aspect, there may be only 8-bits of parity that can enable the error correction scheme to detect and correct one bit flip. In an aspect, adding the $9^{th}$ bit can enable the error correction scheme to correct a single error and detect double error (SECDED). For purposes of this example, only 4 bits of original data are shown (i.e., O1-O4), which results in a 7 bit unfaulted data (EC1-EC7), which includes the original 4 bits of data and the parity bits. The resulting output of this error correction scheme can then be used as one of the inputs for the encoder 22, which is described below. In another example, the original data can include 256 bits of data, which when the error correction scheme is applied can result in a data stream having 266 bits.

Injecting Side Channel

Once the unfaulted data has been generated or created, the confidential data can be introduced or injected. If confidential data is not to be transmitted (i.e. the side-channel stream is empty), the unfaulted data can be simply transmitted as is, and the recipient, upon recovering the original data stream and detecting that the transmitted data does not include any bit-faults, would know that no confidential data has been transmitted.

Conversely, if the confidential data on the side channel is to be transmitted, then a number of bit-faults can be introduced into the unfaulted data, based on confidential data, to generate or create a bit-faulted data. Introducing the bit-faults into the unfaulted data can include flipping at least one bit of the unfaulted data. The at least one bit that is flipped can be used to decode the binary number corresponding to the transmitted confidential data on the side-channel. In an example, consider the total bit-size of the unfaulted data, F, and that the error correction scheme chosen can allow recovery of the complete, original data stream in the presence of up to B bit-flips in the transmitted, F-bit data. The up to B bit-flips can be broken down into those with 1 bit-flip, 2 bit-flips, up to B bit-flips and that each of these allow for "F choose B" possible combinations. An encoding scheme can use the position of a bit-flip in the unfaulted data to encode a number. Given that there are F-bits in the unfaulted data, and any of these bits may be flipped, a single bit-flip can encode a number in the range of 0 to (F−1). Multiple bit-flips can encode a correspondingly larger range from 0 to ((F chose B)−1) or: $\Sigma_{b=1 \ldots B}$ [F!/b!(F−b)!]−1.

A number of bits from the confidential data on the side-channel having the secondary data stream can be treated as representing a binary number, and flipping the bit(s) corresponding to that binary number in the unfaulted data to generate the bit-faulted data. This bit-faulted data can then be transmitted to the recipient on the communications channel.

In an example, as shown in FIG. 5A, to introduce the confidential data, at step 152, the binary number corresponding to the confidential data can be determined. At step 154, the decimal number associated with the determined binary number can be determined and, at step 156, the bit corresponding to the decimal number associated with the determined binary number can be flipped to generate a bit-faulted data.

In an example, the confidential data transmitted on a side channel can include the following properties:

The confidential data should not impose an unduly high transmission overhead (data size) on the primary data traffic;

The confidential data should not impose an unduly high processing overhead on the primary data traffic;

The confidential data should be transparent (not interfere) with the reception of the primary data traffic, regardless of which transmission protocols are used, or the presence of data security schemes such as encryption;

The confidential data should not stand out from the primary data in any way, including when the primary data is encrypted (and thus appears to be a random bit-stream);

The presence of confidential data should be indistinguishable from the absence of the confidential data, as otherwise an attacker could perform differential analysis on data with- and without the confidential data.

FIG. 5B is an exemplary circuit that illustrates how to introduce a single bit-fault; however, this can be expanded to introduce multiple bit-faults. Referring to FIG. 5B, in an example, in practice, the confidential data to be transmitted surreptitiously can include one or more sets of data. For example, as shown in FIG. 5B, the confidential data can include 8 bits of data, which when inputted into a binary to bit value positioner 18 can convert the 8 bits of the confidential data to a corresponding position value of 256 bits (i.e., P1-P256), where at least one bit is high. Table 1 illustrates an example wherein one bit is high. However, in an example where more than one set of data are surreptitiously injected into a data stream over a communication channel, the binary to bit value positioner 18 can convert the 8 bits of the confidential data to a corresponding position value of 256 bits (i.e., P1-P256), where more than one bit is high.

TABLE 1

Input and Output of Binary to Bit Value Positioner

| INPUT | | | | | | | | OUTPUT | | | |
|---|---|---|---|---|---|---|---|---|---|---|---|
| 1 | 2 | 3 | 4 | 5 | 6 | 7 | 8 | 1 | 2 | 3 | 256 |
| 0 | 0 | 0 | 0 | 0 | 0 | 0 | 0 | 0 | 0 | 0 … | 0 |
| 0 | 0 | 0 | 0 | 0 | 0 | 0 | 1 | 1 | 0 | 0 … | 0 |
| 0 | 0 | 0 | 0 | 0 | 0 | 1 | 0 | 0 | 1 | 0 … | 0 |
| . | . | . | . | . | . | . | . | . | . | . | . |
| . | . | . | . | . | . | . | . | . | . | . | . |
| . | . | . | . | . | . | . | . | . | . | . | . |
| 1 | 1 | 1 | 1 | 1 | 1 | 1 | 1 | 0 | 0 | 0 … | 1 |

For purposes of the example in FIG. 5B, only 3 bits of the confidential data are shown (i.e., SU1-SU3) in solid line, which results in a 7 bit output (P1-P7). The confidential data can include any number of bits, n. When n bits of confidential data are inputted into the binary to bit value positioner 18, the number of outputs can be $2^n$.

As shown in FIG. 5B, the results from the binary to bit value positioner 18 and the error correction scheme 20 can be entered into the encoder 22. The encoder 22 can determine and correctly flip the appropriate bit of the unfaulted data. In an example, as shown in FIG. 5B, the encoder 22 can include a plurality of XOR gates to accomplish its task. The encoder 22 can include as many XOR gates as the number of output of the error correction scheme 20 or the number of output of binary to bit value positioner 18. In an example, as shown in FIG. 5B, the encoder 22 can include 256 XOR gates, each XOR gate having two inputs one from the binary to bit value positioner 18 (e.g., 8 bit binary to 256 bit positioner) and one from the error correction scheme 20. As a result, the exemplary encoder 22 can produce encoded outputs E1-E256.

In an example, the encoded outputs E1-E256 can be set to a permutater 23 to potentially change the positions of the bits, such that, for example, the parity bits are no longer at the beginning or at the end of the data stream. Implementing such a permutater will further enable the data to be transferred surreptitiously.

In an example, the output of the encoder 22 can be forwarded to the output interface 24 (FIG. 1) to be transmitted to the data receiving device 50.

In another example, when a permutater 23 is used, the output of the permutater 23 can be forwarded to the output interface 24 to be transmitted to the data receiving device 50. In this example, the data receiving device 50 should know the permutation of the permutater 23 so that it can arrive at the original message.

Recovering Confidential Data on a Side Channel

In an example, a data receiving device 50 can receive a data stream with error correction scheme. The data receiving device 50 can then detect if the received data stream includes at least one bit-fault. If the data receiving device 50 does not detect a bit-fault in the received data stream then the data receiving device 50 can simply recover the original data stream and would know that no confidential data on a side-channel has been transmitted. However, if the data receiving device 50 detects that the received data stream includes at least one bit-fault, then the data receiving device 50 can recover the confidential data on the side channel based on the position of the at least one bit-fault.

Figure 6:
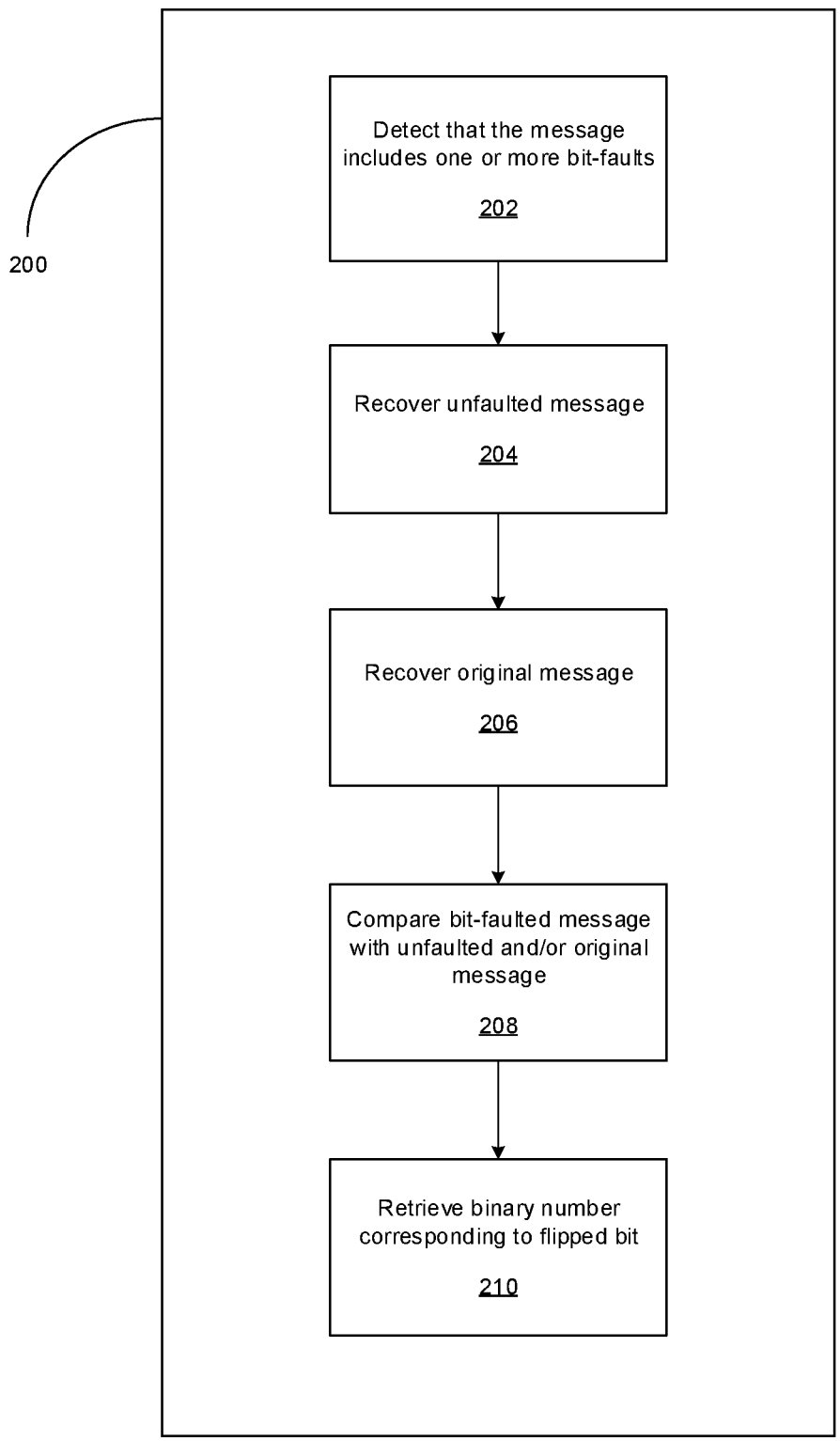
FIG. 6 is a flowchart detailing the steps involved in recovering confidential data on a side channel, according to an example of the present disclosure.

Referring to FIG. 6, in an example, where the bit-faulted data generated in step 150 is transmitted to a recipient on a communication channel, the recipient, at step 202, can detect that the data stream includes one or more bit-faults. The recipient can then, at step 204, recover the unfaulted data (and, by extension, the original data, at step 206). At step 208, the recipient's system can compare the bit-faulted data and the original data of step 206 to directly determine which bits were flipped by the sender. At step 210, the binary number corresponding to the flipped bits can be retrieved to determine the confidential data that was transmitted.

In an example, if the data was encrypted prior to transmitting the data, then the data receiving device 50 can include a decryption device and/or scheme to undo the encryption. Similarly, if the bit-faulted data was permutated, the recipient device can include a scheme to reverse the permutation. In an example, the reversal of the permutation can occur before attempting to detect the bit flip. This can be especially true in a scheme with parity-bits.

Figure 7:
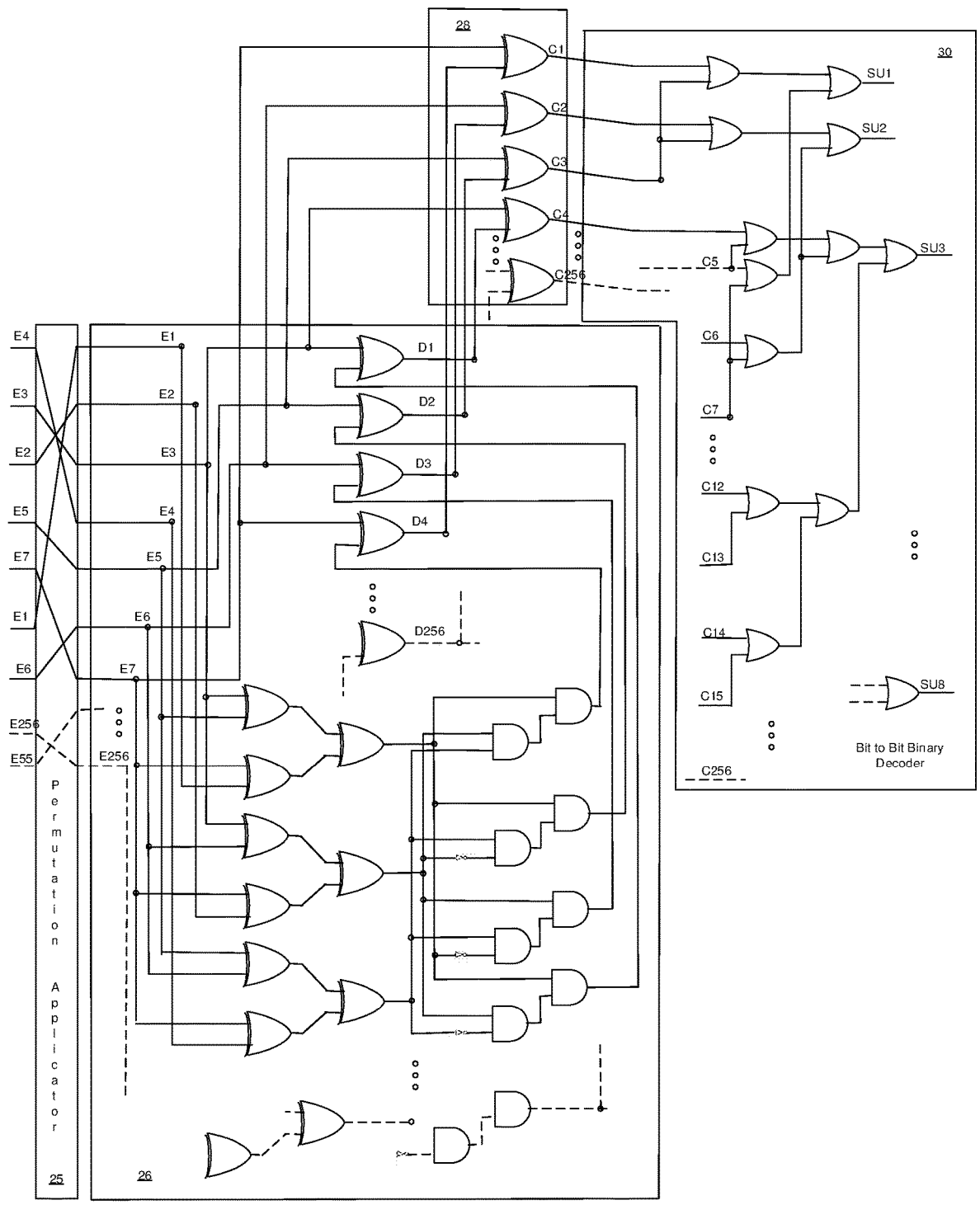
FIG. 7 is an exemplary circuit that can recover the confidential data on the side channel, according to an example of the present disclosure.

FIG. 7 is the counterpart circuit of the exemplary circuit shown in FIG. 5B. Referring to FIG. 7, in an example and in practice, the data receiving device 50 can receive one or more of the encoded outputs E1-E256. If the received one or more of the encoded outputs E1-E256 (i.e., the bit-faulted data) includes a permutation, then the processor 14A can forward the received one or more of the encoded outputs E1-E256 to the permutation applicator 25 prior to sending the received one or more of the encoded outputs E1-E256 to an error correction decoder 26. The permutation applicator 25 can apply a previously received or known permutation so that the permutated bits are placed in the correct position prior to sending the received one or more of the encoded outputs E1-E256 to the error correction decoder 26. If the received one or more of the encoded outputs E1-E256 does not include a permutation, then the processor 14A can then directly transmit E1-E256 to its error correction decoder 26, such as the error correction decoder shown at 26 of FIG. 7, to retrieve the original data D1-D256. To determine if a bit was flipped to create the bit-faulted data, the original data D1-D256 are sent to a comparator 28, where the original data D1-D256 can be compared to the encoded outputs E1-E256. In an example, as shown in FIG. 7, this can be accomplished by a circuit having a plurality of XOR gates to compare the two sets of data and determine the differences by flipping a bit corresponding to the bits that do not match.

Although the comparator 28 can determine with bits were flipped it may not be able to arrive at the confidential data that is associated with the flipped bit. In one example, the decimal digit associated with the flipped bit can be looked up in a table to determine the binary number associated with the flipped bit. In another example, the processor 14A can forward the result of the comparator to a bit to bit binary decoder 30, such as 256 bit to 8 bit decoder. In an example, as shown in FIG. 7, the bit to bit binary decoder 30 can convert a position value of 1-256 to a corresponding binary number. This can be accomplished by a circuit having a plurality of OR gates as shown at 30 in FIG. 7. In this example, the result of the bit to bit binary decoder 30 provides the confidential data SU1-SU8. The processor 14A can then send the result to a monitor 40 for a user to view.

Figure 8:
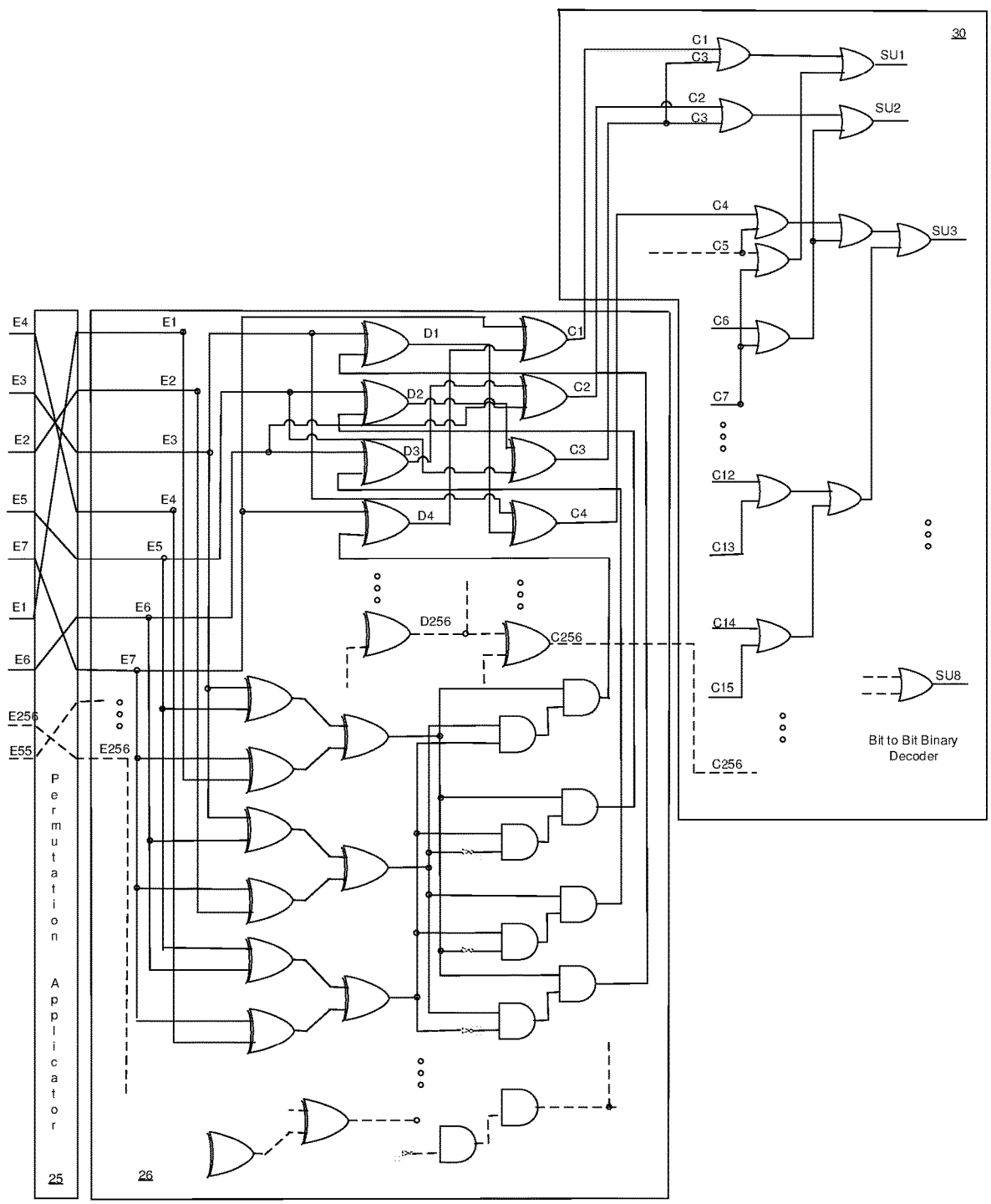
FIG. 8 is an alternative exemplary circuit that can recover the confidential data on the side channel, according to an example of the present disclosure.

In an example, the error correction decoder 26 can determine which one of the bits contains an error. Therefore, there would be no need to have a comparator. An exemplary error correction decoder 26 that determines the bit that includes an error is shown in FIG. 8, which is the counterpart of FIG. 5B. However, other error correction decoders can also be used where they determine the bit that contains the error. In this example, the results from the error correction decoder 26 can be forwarded directly to the bit to bit binary decoder 30 to arrive at the binary number associated with the confidential data in the side channel.

EXAMPLES

Example 1

Confidential data reciting the word "hi" was to be transferred on an existing communication channel with an original data containing 512 bits, which was divided into two sets of 256 bits. An error correction scheme was added to each of the two sets of 256 bits of the original data to create an unfaulted data. The first set of 256 bits unfaulted data and their corresponding decimal bit numbers are shown below, at (1).

| 255 | 254 | 253 | 252 | 251 | ... | 105 | 104 | ... | 7 | 6 | 5 | 4 | 3 | 2 | 1 | 0 | Decimal Bit Numbers |
|---|---|---|---|---|---|---|---|---|---|---|---|---|---|---|---|---|---|
| 0 | 1 | 1 | 1 | 0 | ... | 1 | 0 | ... | 1 | 0 | 0 | 0 | 1 | 0 | 0 | 0 | (1) Unfaulted Data |

It was also determined that the letter "h" in binary code is 01101000, which corresponds to decimal bit number 104.

To surreptitiously transmit the letter "h", the decimal bit number 104, which corresponds to the letter "h," was flipped in the unfaulted data to create a first bit-faulted data as shown below, at (2).

| 255 | 254 | 253 | 252 | 251 | ... | 105 | 104 | ... | 7 | 6 | 5 | 4 | 3 | 2 | 1 | 0 | Decimal Bit Numbers |
|---|---|---|---|---|---|---|---|---|---|---|---|---|---|---|---|---|---|
| 0 | 1 | 1 | 1 | 0 | ... | 1 | 1 | ... | 1 | 0 | 0 | 0 | 1 | 0 | 0 | 0 | (2) Bit-faulted Data |

The first set of 256 bit-faulted data was then sent to a receiver. The receiver recovered the original data by running the error correction scheme and compared the recovered original data with the bit-faulted data. The comparison of the recovered original data and the bit-faulted data determined that the bit corresponding to decimal bit number 104 was flipped and that it corresponds to the letter "h". Therefore, the confidential data includes the letter "h."

The second set of 256 bits and their corresponding decimal bit numbers are shown below, at (3).

| 255 | 254 | 253 | 252 | 251 | ... | 105 | 104 | ... | 7 | 6 | 5 | 4 | 3 | 2 | 1 | 0 | Decimal Bit Numbers |
|---|---|---|---|---|---|---|---|---|---|---|---|---|---|---|---|---|---|
| 0 | 1 | 0 | 1 | 0 | ... | 1 | 0 | ... | 1 | 0 | 0 | 0 | 1 | 0 | 1 | 0 | (3) Unfaulted Data |

It was also determined that the letter "i" in binary code is 01101001, which corresponds to decimal bit number 105.

To surreptitiously transmit the letter "i", the decimal bit number 105, which corresponds to the letter "i" was flipped in the unfaulted data to create a second bit-faulted data as shown below, at (4).

| 255 | 254 | 253 | 252 | 251 | ... | 105 | 104 | ... | 7 | 6 | 5 | 4 | 3 | 2 | 1 | 0 | Decimal Bit Numbers |
|---|---|---|---|---|---|---|---|---|---|---|---|---|---|---|---|---|---|
| 0 | 1 | 0 | 1 | 0 | ... | 0 | 0 | ... | 1 | 0 | 0 | 0 | 1 | 0 | 1 | 0 | (4) Bit-faulted Data |

The second set of 256 bit-fault data was then sent to a receiver. The receiver recovered the original data by running the error correction scheme and compared the recovered original data with the bit-faulted data. The comparison of the recovered original data and the bit-faulted data determined that the bit corresponding to decimal bit number 105 was flipped and that it corresponds to the letter "i." Therefore, the confidential confidential data included the word "hi."

Example 2—Multiple Bit-Flip Case

For illustration purposes, this next example only includes an original data that is 16 bits in length.

Confidential data corresponding to decimal bit numbers 3 and 9 was to be transferred on an existing communication channel with an original data containing 16 bits, which was divided into two sets of 8 bits. An error correction scheme was added to each of the two sets of 8 bits of the original data to create an unfaulted data. The first set of 8 bits unfaulted data and their corresponding decimal bit numbers is shown below, at (5).

| 7 | 6 | 5 | 4 | 3 | 2 | 1 | 0 | Decimal Bit Numbers |
|---|---|---|---|---|---|---|---|---|
| 1 | 0 | 0 | 0 | 1 | 0 | 0 | 1 | (5) Unfaulted Data |

Given that the first portion of the confidential data corresponded to decimal bit number 3, to surreptitiously transmit the confidential data, decimal bit number 3 was flipped in the unfaulted data to create a first bit-faulted data as shown below, at (6).

| 7 | 6 | 5 | 4 | 3 | 2 | 1 | 0 | Decimal Bit Numbers |
|---|---|---|---|---|---|---|---|---|
| 1 | 0 | 0 | 0 | 0 | 0 | 0 | 1 | (6) Bit-faulted Data |

The first set of 8 bit-faulted data was then sent to a receiver. The receiver recovered the original data by running the error correction scheme and compared the recovered original data with the bit-faulted data. The comparison of the recovered original data and the bit-faulted data determined that the bit corresponding to decimal bit number 3 was intentionally flipped. Therefore, the confidential The second set of 8 bits unfaulted data and their corresponding decimal bit numbers are shown below, at (7).

| 7 | 6 | 5 | 4 | 3 | 2 | 1 | 0 | Decimal Bit Numbers |
|---|---|---|---|---|---|---|---|---|
| 1 | 0 | 0 | 0 | 1 | 0 | 0 | 1 | (7) Unfaulted Data |

Given that the second portion of the confidential data corresponded to decimal bit number 9, but the data is only 8 bits, corresponding to decimal bit numbers 0-7, decimal bits 8-35 were programmed as shown below, at (8). Both sender and receiver were aware of the programed decimal bit numbers 8-35.

| | |
|---|---|
| ------X | 0 |
| ------X- | 1 |

-continued

| | |
|---|---|
| -----X-- | 2 |
| ----X--- | 3 |
| ---X---- | 4 |
| --X----- | 5 |
| -X------ | 6 |
| X------- | 7 |
| ------XX | 8 |
| -----X-X | 9 |
| . | . |
| . | . |
| . | . |
| XX------ | 35 |

(8) Enumeration of single- and double-bit-flips

Thus, according to the programmed decimal bits 8-35 above, to indicate a flip in decimal bit number 9, two bits, one at position 6 and one at position 8, were flipped as shown below, at (9).

| 7 | 6 | 5 | 4 | 3 | 2 | 1 | 0 | Decimal Bit Numbers |
|---|---|---|---|---|---|---|---|---|
| 1 | 0 | 0 | 0 | 1 | 1 | 0 | 0 | (9) Bit-faulted Data |

The second set of 8 bit-faulted data was then sent to a receiver. The receiver recovered the original data by running the error correction scheme and compared the recovered original data with the bit-faulted data. The comparison of the recovered original data and the bit-faulted data in combination with the knowledge of the programmed decimal bit numbers 8-35, it was determined that the bits correspond to decimal bit number 9. Therefore, the confidential confidential data included the data corresponding to decimal bit numbers 3 and 9.

From the foregoing description, those skilled in the art can appreciate that the present teachings can be implemented in a variety of forms. Therefore, while these teachings have been described in connection with particular embodiments and examples thereof, the true scope of the present teachings should not be so limited. Various changes and modifications may be made without departing from the scope of the teachings herein.

The scope of this disclosure is to be broadly construed. It is intended that this disclosure disclose equivalents, means, systems and methods to achieve the devices, activities and mechanical actions disclosed herein. For each device, article, method, mean, mechanical element or mechanism disclosed, it is intended that this disclosure also encompass in its disclosure and teaches equivalents, means, systems and methods for practicing the many aspects, mechanisms and devices disclosed herein. Additionally, this disclosure regards a coating and its many aspects, features and elements. Such a device can be dynamic in its use and operation, this disclosure is intended to encompass the equivalents, means, systems and methods of the use of the device and/or article of manufacture and its many aspects consistent with the description and spirit of the operations and functions disclosed herein. The claims of this application are likewise to be broadly construed.

The description of the embodiments herein in their many embodiments is merely exemplary in nature and, thus, variations that do not depart from the gist of the embodiment are intended to be within the scope of the embodiment. Such variations are not to be regarded as a departure from the spirit and scope of the embodiment.

I claim:

1. A non-transitory computer readable storage medium, comprising machine readable instructions executable on a processor to:
    apply an error correction scheme to a data stream to generate an unfaulted data;
    introduce at least one bit-fault to the unfaulted data based on confidential data on a side channel to generate a bit-faulted data; and
    transmit the bit-faulted data,
    wherein the error correction scheme is applied to the data stream prior to introducing the at least one bit-fault.

2. The non-transitory computer readable storage medium of claim 1, wherein to introduce the at least one bit-fault, bits in the confidential data are converted to a corresponding position value of bits in a packet, wherein at least one bit is high; and the unfaulted data and the corresponding position value of bits in the packet are introduced to an encoder.

3. The non-transitory computer readable storage medium of claim 1, wherein the confidential data having a set of bits are converted to a number of bits in the unfaulted data by a bit value positioner.

4. The non-transitory computer readable storage medium of claim 1, wherein the confidential data corresponds to binary numbers associated with position of at least one flipped bit in the bit-faulted data.

5. The non-transitory computer readable storage medium of claim 1, wherein the bit-faulted data comprises at least one bit that is flipped in the unfaulted data.

6. The non-transitory computer readable storage medium of claim 5, wherein the at least one bit that is flipped corresponds to a binary number associated with the confidential data.

7. The non-transitory computer readable storage medium of claim 1, wherein the machine readable instructions executable on the processor encrypts at least one of the data stream; the unfaulted data; and the bit-faulted data.

8. The non-transitory computer readable storage medium of claim 1, wherein the machine readable instructions executable on the processor permutates the bit-faulted data.

9. The non-transitory computer readable storage medium of claim 1, further comprising:
    receive a data stream;
    detect if the received data stream includes the at least one bit-fault, wherein if the received data stream includes the at least one bit-fault, then the received data stream comprises the error correction scheme that detects the at least one bit-fault; and
    recover the confidential data based on the at least one bit-fault.

10. The non-transitory computer readable storage medium of claim 9, wherein the machine readable instructions executable on the processor reverses a permutation of the received data stream.

11. The non-transitory computer readable storage medium of claim 9, further comprises a comparator that compares an original data to the received data stream to discover the at least one bit-fault.

12. The non-transitory computer readable storage medium of claim 9, wherein the at least one bit-fault corresponds to a binary number associated with the confidential data on the side-channel.

13. The non-transitory computer readable storage medium of claim 9, wherein the machine readable instructions executable on the processor recovers the confidential data based on the at least one bit-fault comprising bits to bits decoder and wherein the bits to bits decoder converts position value of bits in a packet to a corresponding bit in the confidential data.

14. A system to surreptitiously inject confidential data into original data over a communication channel comprising:
    an error correction encoder circuit to apply an error correction scheme to an original data stream to create an unfaulted data;
    a binary to bit value positioner that converts and injects bits in the confidential data to corresponding position value of bits in a packet generated by dividing the original data stream; and
    a data stream encoder that flips a bit in the unfaulted data based on the corresponding position value of bits in the packet to create a bit-faulted data.

15. The system of claim 14, wherein the flipped bit comprises a binary number associated with the confidential data.

16. The system of claim 14, further comprising an encrypter that applies an encryption code at least one of (i) prior to the error correction encoder circuit, (ii) prior to the data stream encoder, (iii) and after the data stream encoder.

17. The system of claim 14, further comprising a permutation applicator to permutate the bit-faulted data.

18. A system to recover confidential data that is surreptitiously injected into original data over a communication channel comprising:
    an input interface to receive a data stream having at least one bit-fault;
    an error correction decoder circuit to at least one of recover original data from the data stream and detect at least one bit-fault; and
    a bit to bit decoder that converts a position value of bits in a packet, originally generated by dividing the original data stream, to a corresponding bits in the confidential data.

19. The system of claim 18, further comprising a permutation applicator to reverse a permutation of the received data stream.

20. The system of claim 18, further comprising a comparator that determines bits position values in the packet that correspond to the confidential data.

* * * * *